United States Patent [19]
Blake

[11] Patent Number: 5,718,189
[45] Date of Patent: Feb. 17, 1998

[54] WAIST MOUNTED LEASH

[76] Inventor: Deborah Blake, P.O. Box 8083, Spokane, Wash. 99203-0083

[21] Appl. No.: 572,507

[22] Filed: Dec. 14, 1995

[51] Int. Cl.⁶ ................................................. A01K 27/00
[52] U.S. Cl. ........................... 119/770; 119/792; 2/312
[58] Field of Search ............................ 119/770, 792, 119/795, 797; 2/311, 312, 318, 321, 322

[56] References Cited

U.S. PATENT DOCUMENTS

| | | | |
|---|---|---|---|
| D. 337,395 | 7/1993 | Erlinger et al. | D30/153 |
| D. 350,628 | 9/1994 | Williams | D30/153 |
| 2,356,715 | 8/1944 | Webster et al. | |
| 3,295,501 | 1/1967 | Riley . | |
| 4,584,967 | 4/1986 | Taplin | 119/793 |
| 4,751,896 | 6/1988 | Miley | 119/770 |
| 4,787,340 | 11/1988 | Kirtley | 119/792 |
| 5,080,045 | 1/1992 | Reese | 119/795 |
| 5,081,719 | 1/1992 | Donnelly | 2/312 X |
| 5,105,828 | 4/1992 | Grant | 128/876 |
| 5,161,486 | 11/1992 | Brown | 119/795 |
| 5,484,395 | 1/1996 | DeRoche | 2/312 X |
| 5,539,933 | 7/1996 | Garber et al. | 2/321 X |

OTHER PUBLICATIONS

Catalog, "For Pets Only Becuase we care . . . ", (Spring 1995), For Pets Only, Mountain View, CA 94039, Front Cover, p. 20.

Catalog, "Foster Doctors Smith", (Spring 1995), Drs. Foster & Smith, Inc., Rhinelander, WI 54501, Front Cover, p. 105.

*Primary Examiner*—Robert P. Swiatek
*Assistant Examiner*—Elizabeth Shaw
*Attorney, Agent, or Firm*—Wells, St. John, Roberts, Gregory & Matkin, P.S.

[57] ABSTRACT

A belt having first and second ends is adapted to encircle the waist of a user. A quick-release fastener is provided between the two ends and is releasable by pulling outwardly on a protruding hand loop at one free end of the belt. A leash can be secured to the belt at a location between its two ends. The belt provides normal control to a leashed animal or child, allowing the user's arms to swing freely while walking or running. Continuous control of an animal or child during and after release of the belt is provided by grasping the hand loop and pulling outwardly, thereby causing a portion of the belt to act as a hand-held leash extension.

11 Claims, 4 Drawing Sheets

WAIST MOUNTED LEASH

TECHNICAL FIELD

This disclosure pertains to a leash for dogs, other animals or young children. It is mounted about the waist of a user, leaving the hands of the user entirely free.

BACKGROUND OF THE INVENTION

This invention arose from an effort to provide a hands-free leash for controlling a dog or child while walking or running.

Holding a dog by means of a hand-held leash subjects the user to pulling forces that are uncomfortable to both the user and animal. Various devices have been previously available for walkers or joggers as an alternative to the standard hand-held leash. While other solutions that attach a leash to a waist mounted belt have been proposed, most have been either bulky or difficult to disengage.

Rapid disengagement of a belt-supported leash is critical for the safety of the user, particularly when running with a larger dog or other animal. A large dog or other animal, if running in conjunction with a human person, can readily throw that person off balance if attached to his or her waist. The present belt has been designed to be continually attached to a guiding leash, and is readily disengaged under the manual control of the user. At all times the necessary manual control of the leash is maintained.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Figure 1:
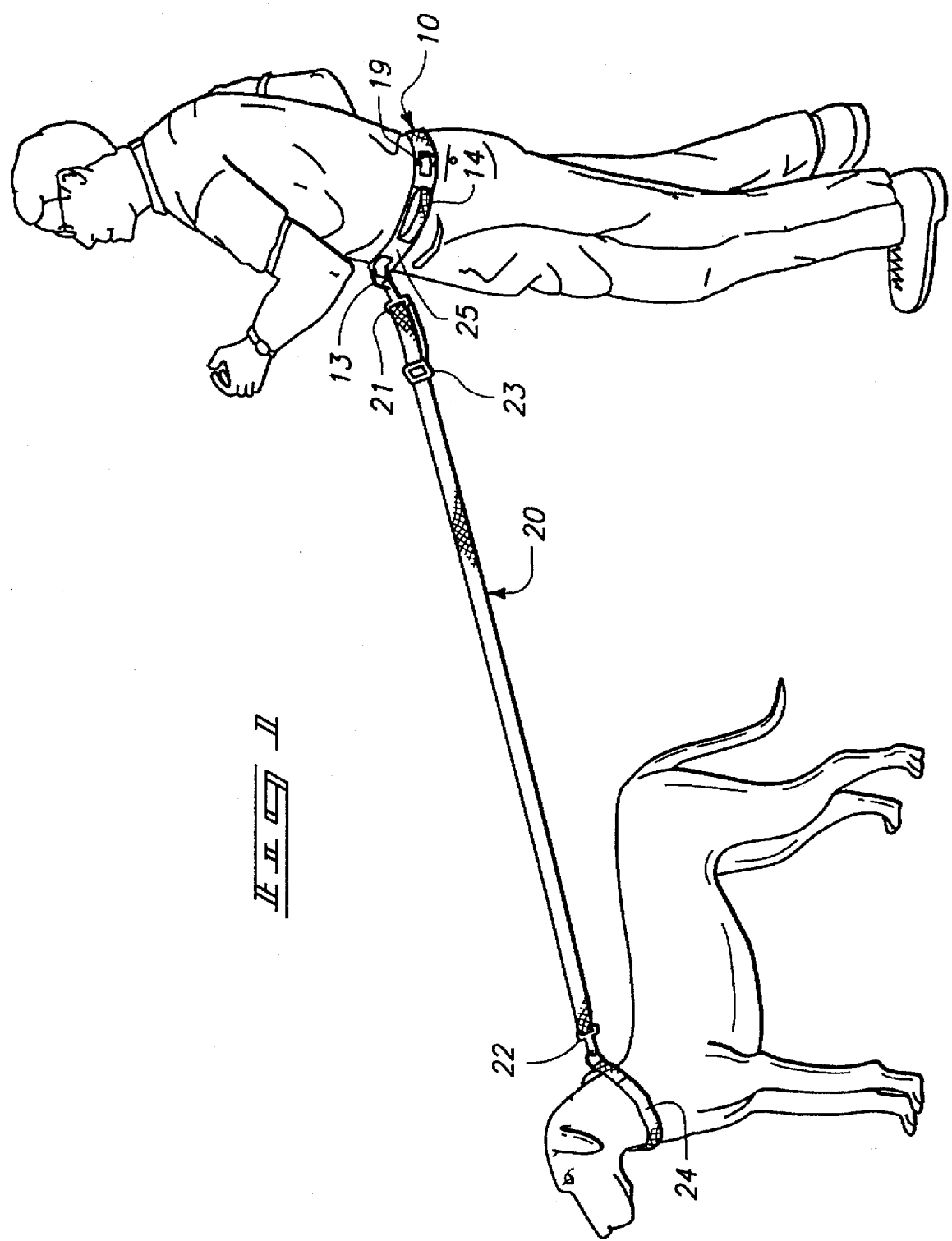
FIG. 1 is an illustration of the waist-mounted leash while the user is walking or jogging.

This disclosure of the invention is submitted in furtherance of the constitutional purposes of the U.S. Patent Laws "to promote the progress of science and useful arts" (Article 1, Section 8).

While the waist-mounted leash disclosed in the drawings was designed specifically for dogs, its uses are not limited in any manner. It might be used for controlling or training any animal. In addition, the leash might also have applications relating to the control of infants or toddlers.

The waist-mounted leash shown in the drawings basically comprises a belt 10 and an attached leash 20. Leash 20 includes releasable clips at its first and second ends 21, 22. An intermediate adjustment slide 23 defines an adjustable length loop shown at the first end 21 of leash 20. This permits adjustment of the leash length to accommodate both a dog and user.

The first end 21 of leash 20 is provided with a conventional spring-retained clip 30 for releasable attachment to belt 10. The second end 22 of leash 20 has a similar conventional spring-retained clip 30 adapted to releasably attach to a harness or collar 24 worn by a child or a dog or other animal.

Belt 10 is adapted to encircle the waist of a user, as illustrated in FIG. 1. This usage leaves the hands of the user entirely free for unrestricted movement while exercising, walking, jogging or engaging in other forms of physical activity.

The illustrated belt 10 is a length of webbing, preferably made of polypropylene, nylon or other strong, flexible materials. It has a first end 11 and a second end 12. A first attachment member 13 is mounted to the waist belt 10 at a location intermediate its first and second ends 11, 12. The attachment member 13 is shown as a conventional D-ring sewn to the outer surface of belt 10. It can be either fixed in place, as illustrated, or adjustable about the length of belt 10.

Figure 4:
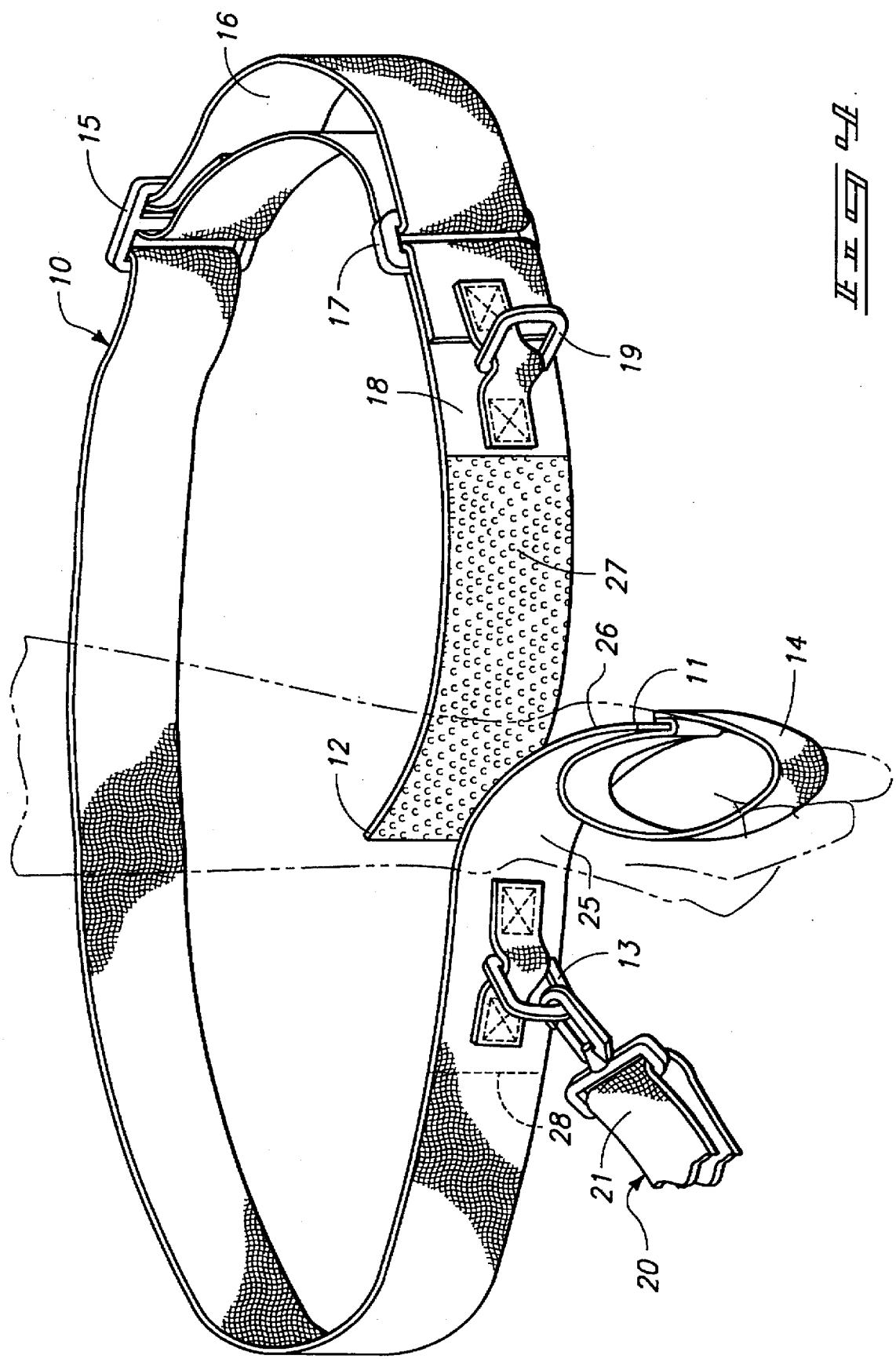
FIG. 4 is a similar view of the leash during disengagement.

A quick-release fastener is operably engaged between the first and second ends 11, 12 of the belt 10. It is disengageable in response to outwardly or sidewardly directed manual pulling force being applied to one end of the belt, as illustrated in FIG. 4.

Figure 3:
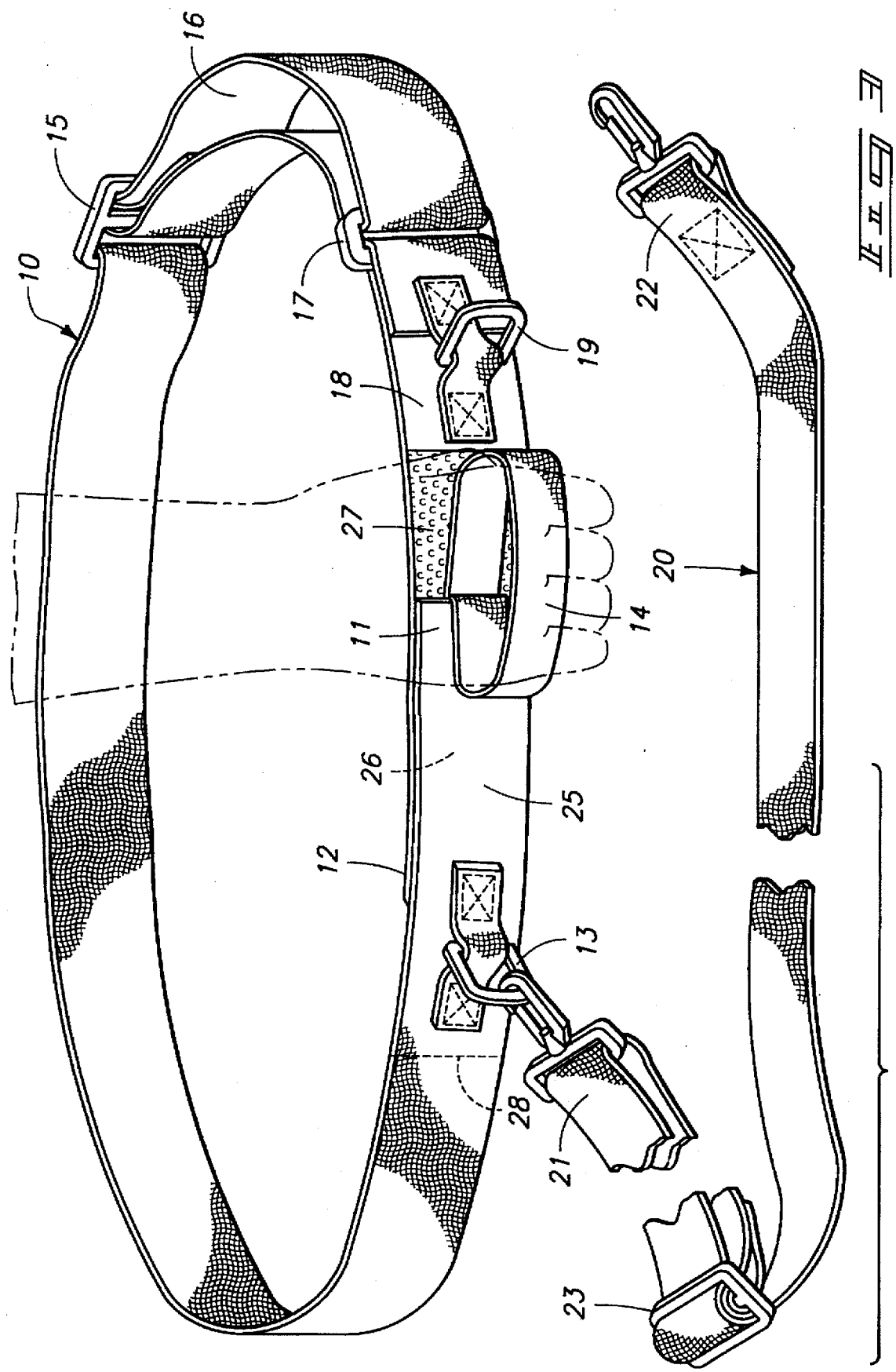
FIG. 3 is a fragmentary perspective view of the waist-mounted leash in an engaged condition.

In the illustrated and preferred embodiment of the invention, the quick-release fastener comprises complementary areas 26, 27 of contact attachment structures. These might be in the form of elongated areas of hook and loop fasteners (Velcro) provided on oppositely facing areas 26, 27 along overlapping sections of the respective first and second ends 11, 12 of the belt 10. The inner end of surface area 26, which faces into the drawing illustrations, is indicated at line 28 in FIGS. 3 and 4 for reference purposes.

The illustrated surface area 26 of hook fastener material extends to the first end 11 of belt 10, and the illustrated surface area 27 of complementary loop fastener material extends to the second end 12. They are formed along a common side of belt 10 so as to be in the desired oppositely facing overlapping configuration when wrapped about the waist of a user.

It is to be understood that other forms of quick-release fasteners might be substituted in place of the Velcro-type fastener shown in the drawings. In each instance, the fastening material or device must be releasable or disengageable in response to an outwardly-directed pulling force at its free first end 11. One example of an alternative fastening arrangement might be complementary male and female snap fasteners.

Belt 10 is adjustable in length. A conventional adjustment slide 15 is attached to a free belt end and forms an adjustable loop 16 that can be lengthened or shortened as desired.

A short terminal section 18 of belt 10 terminates at the belt's second end 12. End 12 includes the surface area 27 of loop fastener material. The terminal section 18 is connected to the adjustable loop 16 by a conventional rectangular D-ring 17. D-ring 17 is freely movable about the enclosed adjustable loop 16 and interconnects it to the end 12.

To provide additional versatility, a second attachment member 19, identical to the previously-described attachment member 13, can be provided adjacent to the D-ring 17 along the terminal belt section 18. It can be used alternately to attachment member 13, dependent upon which side of the user is to support a leash 20.

The present disclosure is distinguished by provision of a closed loop 14 that is formed on the belt 10 at a location adjacent to its first end 11. Loop 14 might be formed from the webbing of the belt itself. In the illustrated embodiment, it is a separate element sewn to and protruding beyond the belt's first end 11.

Loop 14 permits one wearing the belt 10 to grip and pull the free first end 11 of the belt in an outward or sideward direction relative to the waist-encircling second end 12. In this manner, the quick-release fastener that joins the ends of belt 10 can be readily disengaged.

Figure 2:
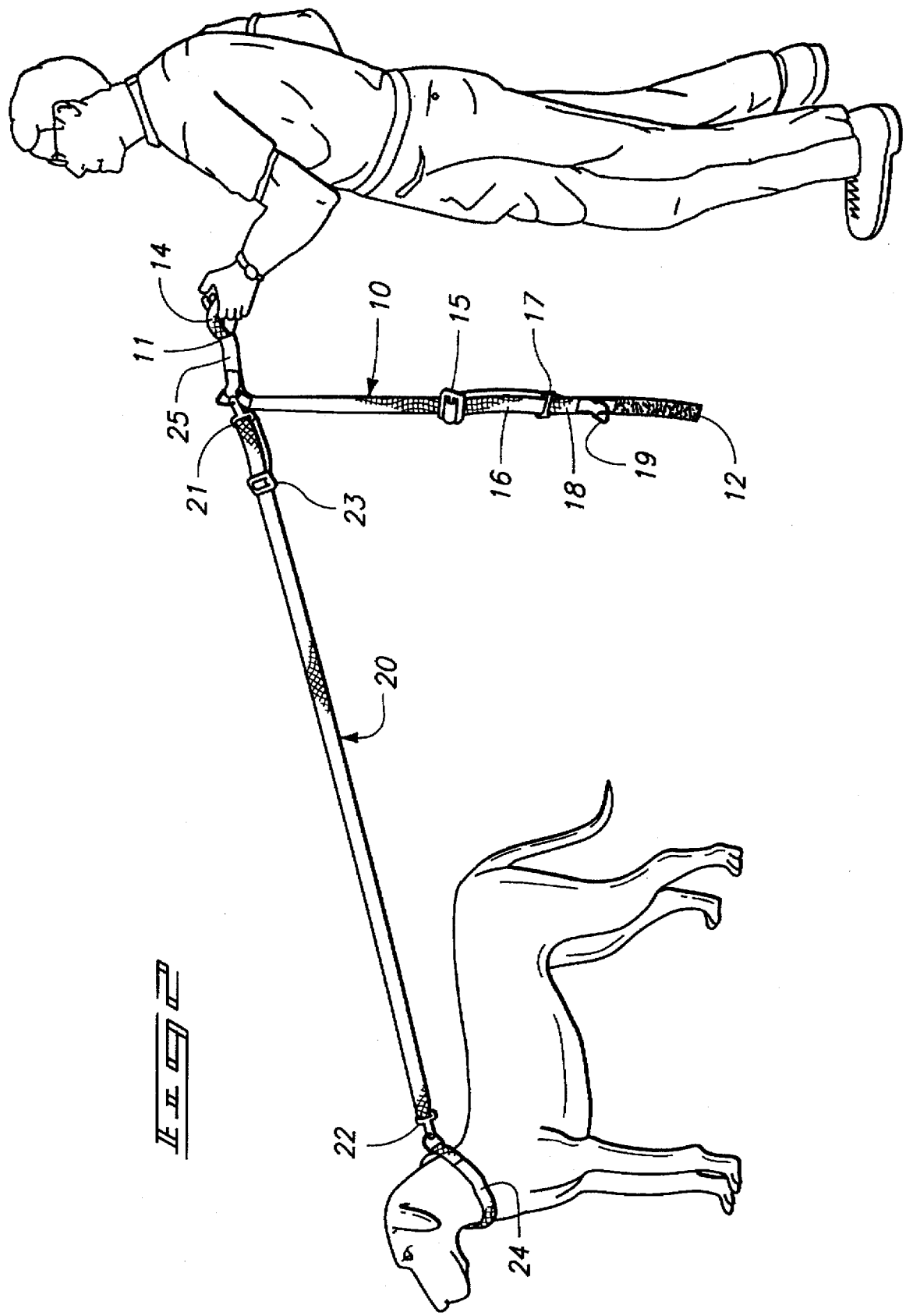
FIG. 2 is an illustration of the released leash under control by a hand of the user.

As illustrated by FIGS. 2 and 4, when the belt 10 is disengaged, the belt section 25 between loop 14 and attachment member 13 serves as an extension of the leash 20 both during and after such connection between the user and leash 20. The user is either connected to the leash 20 by the encircling belt 10 or by the hand of the user which grips and releases the belt. As seen in FIG. 2, the remainder of belt 10 hangs loosely from the attachment member 13, and serves no functional purpose when the belt is disengaged.

Loop 14 is preferably flexible and made from material identical or similar to the webbing of belt 10. It should be sized to receive the hand of a user within the loop, so that the user's fingers can close to control the loop 14 as the terminal end of the "extended" leash 20.

The complementary surface areas 26, 27 of hook and loop fasteners that are located in opposition to one another along the overlapping sections of the respective first and second ends 11, 12 of belt 10 are releasable when one end is pulled outwardly or sidewardly relative to the other. However, they are not released from one another due to tangential pulling forces received at attachment member 13 from the end of leash 20.

Loop 14 is movable outwardly or sidewardly with the free end of belt 10, while forces at attachment member 13 are resisted by opposing forces along belt 10 to each side of the attachment member 13. The encircling belt prevents outward or sideward movement of attachment 13. Belt 10 will not be released due to pulling forces on the leash 20 and attachment member 13 because attachment member 13 is spaced from the belt's free first end 11 and the resulting forces will be tangentially applied at the overlapping sections of the respective first and second ends 11, 12 of belt 10. Thus, belt 10 will not be released when pulled by a dog or other animal while the leash user is running or walking.

Belt 10 can be used by persons who are left handed or right handed by simply inverting the belt from the orientation shown in FIG. 1 to place the loop 14 at the side of the person which will be used to grip and pull the protruding loop 14.

The waist-mounted leash shown in the drawings and described above permits a user to assume normal arm swinging movements, which is important for good form and comfort when walking or running. This substantially adds to the ability of the user to exercise properly while maintaining hand-free control of a dog. The ability to readily transfer control to one's hand also provides the user with confidence that he or she will not be pulled off balance by unexpected forces exerted by the animal.

In practice, dogs have been found to be as easy to control when attached to the waist of a user as when attached to a hand-held leash. Furthermore, one can walk two dogs by using both a hand-held leash and the waist-mounted leash. In practice, this has been found to be easier than simply using two hand-held leashes.

A dog that does well on a lead and does not resist control is an ideal animal for connection to the present leash. It is designed to be used with pets that are trained to walk or run alongside a person. If a pet pulls strongly, lunges or has an unpredictable nature, it might not be a suitable subject for the described leash combination.

While not shown in the drawings, it is to be understood that belt 10 might also support one or more belt accessories (not shown), such as a water bottle, key pouch, fanny pack, etc. If attached by supporting loops, such items will merely hang from the loose end of the belt 10 after it has been disengaged in the manner shown in FIG. 2.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A waist-mounted leash, comprising:
    a belt including first and second ends, the belt being adapted to encircle the waist of a user with the first and second ends overlapping one another;
    a quick-release fastener operably engageable between the first and second ends of the belt, the quick-release fastener being disengageable in response to manual pulling force applied to one end of the belt in a direction tending to separate the overlapping first and second ends of the belt;
    an attachment member for attachment to one end of a leash, the attachment member being mounted to the belt at a location intermediate its first and second ends; and
    a loop formed on the belt at a location adjacent to the one end of the belt, the loop protruding beyond the one end of the belt for permitting one wearing the belt to grip and pull the one end of the belt outwardly relative to its remaining end to thereby disengage the quick-release fastener while using a section of the belt between the loop and attachment member as an extension of a leash during and after such disengagement.

2. The waist-mounted leash of claim 1, wherein the quick-release fastener comprises complementary areas of contact attachment structures along the respective first and second ends of the belt.

3. The waist-mounted leash of claim 1, wherein the quick-release fastener comprises complementary areas of hook and loop fasteners on oppositely facing surfaces along overlapping sections of the respective first and second ends of the belt.

4. The waist-mounted leash of claim 1, further comprising:
    a leash having first and second ends, one end of the leash being secured to the attachment member and its remaining end being adapted to be secured to a collar or harness.

5. The waist-mounted leash of claim 1, wherein the loop is sized to receive the hand of a user.

6. The waist-mounted leash of claim 1, wherein the loop is flexible and sized to receive the hand of a user.

7. A waist-mounted leash, comprising:
    a flexible belt including first and second ends, the belt being adapted to encircle the waist of a user with the first and second ends overlapping one another;
    a leash attached to the belt at a location intermediate its first and second ends;
    a quick-release fastener operably engageable between the overlapping first and second ends of the belt, the quick-release fastener being disengageable in response to manual pulling force applied to one end of the belt in a direction tending to separate the overlapping first and second ends of the belt; and a flexible loop on the one end of the belt for permitting a human user wearing the belt to grip and pull the loop and one end of the belt outwardly or sidewardly relative to its remaining end to thereby disengage the quick-release fastener while using a section of the belt between the loop and attachment location as an extension of the leash during and after such disengagement.

8. The waist-mounted leash of claim 7, wherein the quick-release fastener comprises complementary areas of contact attachment structures along overlapping sections of the belt extending to the respective first and second ends of the belt.

9. The waist-mounted leash of claim 7, wherein the quick-release fastener comprises complementary areas of hook and loop fasteners on oppositely facing surfaces at a common side of the belt along overlapping sections extending to the respective first and second ends of the belt.

10. The waist-mounted leash of claim 7, wherein the loop is also flexible and sized to receive the hand of a user.

11. The waist-mounted leash of claim 7, wherein the loop protrudes beyond the one end of the belt and is also flexible and sized to receive the hand of a user.

* * * * *